(12) United States Patent
Bogatu

(10) Patent No.: US 8,337,807 B1
(45) Date of Patent: Dec. 25, 2012

(54) FULLERENE/TITANIUM HYDRIDE GAS SOURCE

(75) Inventor: Ioan-Niculae Bogatu, San Diego, CA (US)

(73) Assignee: FAR-TECH, Inc., San Diego, CA (US)

( * ) Notice: Subject to any disclaimer, the term of this patent is extended or adjusted under 35 U.S.C. 154(b) by 1402 days.

(21) Appl. No.: 12/002,420

(22) Filed: Dec. 17, 2007

(51) Int. Cl.
*B01J 19/08* (2006.01)
*C01B 3/00* (2006.01)
*C01B 3/02* (2006.01)

(52) U.S. Cl. .................. 423/659; 423/445 B; 423/658.2

(58) Field of Classification Search .................. None
See application file for complete search history.

(56) References Cited

U.S. PATENT DOCUMENTS 6,399,929 B1 * 6/2002 Hanton et al. ................ 219/645
2005/0229489 A1 * 10/2005 Bavarian et al. ............. 48/198.7

FOREIGN PATENT DOCUMENTS

JP           03122205 A   *  5/1991

OTHER PUBLICATIONS

Aso, JP 03122205 A, Published May 24, 1991, Derwent English Abstract.*
Voronin, A.V. et al, A Titanium Hydride Gun for Plasma Injection into The T2-reversed Field Pinch, Plasma Phys. Control. Fusion 41 (1999), p. 293-302, IOP Publishing, UK.
Moalem, M. et al, Sublimation of Fullerenes and Their Interaction With Silicon (100) Surface, J. Phys. Chem., 1995, v. 99, p. 16736-16741, Am Chem Soc, US.
Setoyama, D. et al, Mechanical Properties of Titanium Hydride, J. Alloys & Compounds 381 (2004), p. 215-220, Elsevier.
Setoyama, D. et al, Thermal Properties of Titanium Hydrides, Jour. Nuc. Materials 344 (2005), p. 298-300, Elsevier.
Voronin, A.V. et al., Development of Intense Plasma Jet Fuelling Source, 31st EPS Conf on Plasma Phys., London, 2004, ECA vol. 28G, p. 1.109.
Voronin, A.V. et al, High Kinetic Energy Jet Injection Into Globus-M Spherical Tokamak, IAEA (2005), EX-P3-18.
Voronin, A.V. et al, High Kinetic Energy Plasma Jet . . . Globus-M Spherical Tokama, Nucl. Fus. 45 (2005), Inst Phys Pub/IAEA, UK.
Voronin, A.V. et al., High Kinetic Energy Dense Plasma Jet, Nukleonika 2006;51(1):85-92.
Voronin, A.V. et al, Gen. of Dense Plasma Clusters with High Velocity, Plasma Phys Control. Fus. 43 (2001) 1583-1592, Inst Phys Pub, UK.
Whyte, D.G et al, Disruption Mitigation With High-Pressure Noble Gas Injection; Proc 15th Intl Conf on Plasma Surface Interactions . . . ; May 27-31, GA # GA-A23996, Oct. 2002.

* cited by examiner

*Primary Examiner* — Melvin C Mayes
*Assistant Examiner* — Colin W Slifka
(74) *Attorney, Agent, or Firm* — William A. Eklund

(57) ABSTRACT

A solid mixture of fullerene and titanium hydride, a method of its formation, and a method of its use to rapidly produce a gaseous mixture of molecular hydrogen and fullerene on demand. The solid mixture may be resistively heated by discharge of a high power electrical current from a capacitor bank through the mixture to produce the mixture of hydrogen and fullerene within a few tens of microseconds. The resulting gaseous mixture of hydrogen and fullerene may be ionized and accelerated for the purpose of mitigating electromagnetic disruptions in a magnetically confined plasma.

3 Claims, No Drawings

FULLERENE/TITANIUM HYDRIDE GAS SOURCE

BACKGROUND OF THE INVENTION

The present invention is generally related to compositions, methods and apparatus for producing gaseous mixtures. In particular, the present invention is related to methods for rapidly producing gaseous mixtures that are particularly useful for mitigating major disruption events in plasmas such as those created in magnetically confined fusion plasma devices.

Gaseous plasmas generally consist of mixtures of electrons, positively charged ionic species, and neutral gaseous atoms and/or molecules. In various devices, magnetic fields are used, to confine the hot plasma within a containment vessel so that the plasma does not touch the vessel wall.

The phenomenon known as major disruption of a magnetically confined plasma is a fast and detrimental process by which the large amount of thermal and magnetic energy, that normally exists in a magnetically confined plasma is transferred to the wall of the plasma containment vessel, leading to its damage, up to and including melting and vaporization of the wall material. Such disruptions are created by macroscopic instabilities in the plasma that cause a rapid thermal quench of the plasma column. The disruption phenomenon also produces large forces acting on the mechanical structure of the containment vessel. Magnetically confined plasma devices such as the International Thermonuclear Experimental Reactor (ITER) now under construction would benefit from a reliable and real-time process for preventing or mitigating this phenomenon.

The basic approach to plasma disruption mitigation involves quickly converting the thermal and magnetic energy of the plasma, which is typically characterized by a plasma energy density of approximately 1 gigajoule (GJ) in a volume of approximately 1,000 cubic meters in a device such as the ITER, into radiation within a time period of approximately 1 millisecond, while simultaneously increasing the density of free and bound electrons in the plasma by a factor of approximately 100 over the entire plasma cross section. This process suppresses the conversion of the plasma and magnetic field energy into an avalanche of high energy runaway electrons, which would otherwise reach the wall of the plasma containment vessel and cause its melting and vaporization.

One specific version of this approach is known as the impurity injection method.. One impurity injection method involves ionizing an impurity gas to form an impurity plasma, followed by electro-dynamic acceleration of the impurity plasma and its injection into the target plasma, which converts the target plasma energy into radiation and provides a harmless and rapid quench of the plasma thermal energy and current.

This method must utilize enough mass of an impurity gas of sufficiently high atomic number, which must be injected with a density and velocity that are sufficiently high that the impurity ions penetrate to the core of the hot plasma and strongly radiate the energy on the fast disruption time scale in order to achieve real-time mitigation. High pressure jets of neutral gaseous species, such as the inert gases neon or argon, have been considered for this purpose in the technique known as massive injection. However, one well recognized problem is that once the impurity gas atoms are ionized in a thin outer layer of the hot plasma, they can no longer penetrate the confining magnetic field unless they possess a sufficiently high velocity to overcome the magnetic pressure of the magnetic field confining the plasma. The injection velocity of a neutral gas is limited to a relatively low value and thus the mitigation process must rely on the inward propagation of a cooling front wave, enhancement of magneto-hydrodynamic (MHD) activity, and mixing of impurity gas into the core plasma. These processes take a relatively long time time, estimated to be at least 40 milliseconds for the ITER device. Moreover, controlling the sequence and timing of these processes is difficult, yet they are necessary to obtain reliable and prompt disruption mitigation.

One approach to the problem of delivering an impurity gas having sufficient mass to penetrate a plasma has been the proposed use of "dusty" plasma, which is an ionized gas containing particles of carbon, or other particulate material, having a size on the order of 10 microns in diameter. One problem with such an approach, however, is that the injection plasma must be accelerated, and the particulate matter in such a plasma is very heavy, such that it must be dragged b the ambient accelerated plasma, a process that limits the velocities that can be obtained with the particulate material.

Accordingly, it is the object and purpose of the present invention to provide a composition that is capable of rapidly producing on demand a gas that is suitable for mitigating disruptions in plasmas, as well as methods for making such a composition and producing the gas from such composition on demand.

SUMMARY OF THE INVENTION

In accordance with the present invention there is provided a novel composition of matter, a method for its use, and a method for its formation.

The composition of matter of the present invention consists essentially of a solid mixture of titanium hydride ($TiH_2$) and fullerene ($C_{60}$). Such a mixture is capable of being heated to produce a gaseous mixture of molecular hydrogen ($H_2$) and fullerene on demand.

The solid mixture may be used, in accordance with the method of the present invention, to produce a gaseous mixture of molecular hydrogen and fullerene on demand, by heating the mixture to a temperature of between approximately 300° C. and 600° C. The mixture is preferably heated by passing a high power electrical current through the mixture, resulting in rapid resistive heating of the mixture and emission of the gaseous mixture by dissociation of the titanium hydride and sublimation of the fullerene. Rapid resistive heating is preferably accomplished by applying a high power electrical current to the mixture from a bank of charged electrical capacitors.

The solid mixture of the present invention preferably consists essentially of solid granular titanium hydride infused with fullerene, which is preferably in the form of a fine-grained fullerene powder interspersed in the interstitial spaces between grains of titanium hydride. Such a mixture is sufficiently electrically conductive to permit rapid resistive heating by passage of a high power electrical current through it. Such a mixture may be formed by the method of the present invention, which includes the steps of infusing solid granular titanium hydride with a solution of fullerene dissolved in an organic solvent, followed by evaporation of the solvent to leave the fullerene in the form of a fine-grained powder.

The gaseous mixture of hydrogen and fullerene produced by the method and composition of the present invention may be subsequently ionized and accelerated as a plasma slug in a coaxial plasma gun, and thereby injected into a hot target plasma for the purpose of mitigating a disruption before it results in damage to the surrounding containment vessel.

These and other aspects of the present invention are further described in the following detailed description of the preferred embodiment.

DETAILED DESCRIPTION

In accordance with the preferred embodiment of the present invention, a composition of matter suitable for producing on demand a gaseous mixture of molecular hydrogen ($H_2$) and fullerene ($C_{60}$) consists essentially of a solid mixture of fullerene and titanium hydride ($TiH_2$).

Fullerene is a carbon molecule consisting of 60 carbon atoms connected in an approximately spherical geometric array. It is also casually referred to as buckyball or buckminsterfullerene. Fullerene is commercially available in the form of a black granular powder that is stable at room temperature. Fullerene sublimates at a nominal temperature of approximately 527° C.

Titanium hydride is also a solid at room temperature. Upon being heated to a temperature range of approximately 300° C. to 600° C., titanium hydride releases molecular hydrogen gas ($H_2$), leaving behind solid metallic titanium. Such heating produces approximately 448 $cm^3$ of hydrogen per gram of titanium hydride.

While the present invention is described here in part by references to the use of titanium hydride and its dissociation to produce hydrogen, it should be understood that the isotopes of hydrogen, namely deuterium and tritium, are equally suitable for use in the present invention, and may in fact offer certain advantages in the practice of the invention. Thus the term "hydrogen" herein means deuterium and tritium, as well as the isotope common commonly known as hydrogen.

The solid mixture of the present invention preferably consists of titanium hydride and fullerene in the ratio of approximately 2.5 to 1.0 by weight.

In accordance with the preferred embodiment of the method present invention, the solid mixture of fullerene and titanium hydride is formed by infusing a quantity of solid, granular titanium hydride with a saturated solution of fullerene dissolved in a suitable volatile solvent, for example 1,2,4 trichlorobenzene, carbon disulfide, or toluene. The infused mixture is then heated to a temperature of less than 300° C. to evaporate and remove the solvent without dissociating the titanium hydride or sublimating the fullerene, thus leaving behind a solid mixture made up of solid, fine-grained fullerene deposited in the interstitial spaces within the granular titanium hydride. The resulting solid mixture can be stored indefinitely until needed.

In accordance with the method of the present invention for using the solid mixture of titanium hydride and fullerene, the mixture is heated to a temperature of between approximately 300° C. and 600° C., which results in dissociation of the $TiH_2$ to produce gaseous hydrogen ($H_2$) and sublimation of the fullerene to produce gaseous fullerene, leaving behind solid titanium that is essentially depleted of hydrogen. The solid mixture is preferably heated as rapidly as possible in order to release the hydrogen and fullerene essentially simultaneously; that is, without differential release of hydrogen and fullerene at different rates or at different times and temperatures.

Rapid heating is preferably accomplished by electro-thermal resistance heating, which is attained by passing a high power electrical current through the solid mixture. An example of a suitable source for such a high power electrical current is a bank of charged electrical capacitors, which is preferably capable of providing a current of approximately 14 kiloamperes through a volume of approximately 3 $cm^3$ of the solid mixture of titanium hydride and fullerene. Electro-thermal heating of the mixture is desirable because it produces a discrete parcel of gaseous hydrogen and fullerene within a period of a few microseconds.

The resulting gaseous mixture consists of hydrogen, which has a very low molecular weight of 2 grams/mole, and fullerene, which has a molecular weight of 720 grams/mole, which is very high for a stable gaseous species.

This combination of high- and low-molecular weight gaseous species can then be partially ionized to create what is sometimes referred to as a plasma slug. Ionization may be accomplished with an electron beam or other known processes for creating a plasma. The resulting plasma slug may be accelerated and injected into a second plasma, to quench the second plasma and mitigate electromagnetic disruptions in the second plasma. The advantage of the combination of ionized hydrogen and fullerene is that it can be used to produce a heavy plasma slug, with mass distributed uniformly over the slug volume, which upon acceleration is suitable for penetrating the hot second plasma and its confining magnetic field. Further, the mixture of hydrogen and fullerene is entirely gaseous, unlike dusty plasmas previously proposed for disruption mitigation, thus resulting in a more homogenous and predictably controllable plasma for use in disruption mitigation.

The present invention is described herein by reference to certain preferred embodiments. However it is understood that various modifications and variations may be made by one of ordinary skill in the art without departing from the present invention. Consequently the scope of the present invention is defined by the following claims.

The invention claimed is:

1. A method of using a solid mixture of titanium hydride and fullerene to produce a gaseous mixture of molecular hydrogen and fullerene, comprising the step of heating said solid mixture to a temperature of between approximately 300° C. and 600° C., whereby said titanium hydride is dissociated to produce gaseous molecular hydrogen and said fullerene is sublimated to produce gaseous fullerene.

2. The method defined claim 1 wherein said solid mixture is heated by passage of a high power electrical current through said solid mixture.

3. The method defined in claim 2 wherein said high power electrical current is produced by discharge of a bank of charged electrical capacitors.

* * * * *